United States Patent [19]

Amanuma et al.

[11] Patent Number: 5,502,536
[45] Date of Patent: Mar. 26, 1996

[54] ELECTRICALLY POWERED CAMERA

[75] Inventors: Tatsuo Amanuma, Saitama; Nobuhiko Terui; Hidenori Miyamoto, both of Chiba; Junichi Omi, Kanagawa, all of Japan

[73] Assignee: Nikon Corporation, Tokyo, Japan

[21] Appl. No.: 375,722

[22] Filed: Jan. 20, 1995

[30] Foreign Application Priority Data

Jan. 20, 1994 [JP] Japan ...................................... 6-004889

[51] Int. Cl.⁶ .............................. G03B 3/10; G03B 5/00; G03B 7/00
[52] U.S. Cl. ......................... 354/400; 354/484; 354/485; 354/202; 354/234.1
[58] Field of Search ..................................... 354/485, 484, 354/286, 400, 402, 234.1, 430, 202

[56] References Cited

U.S. PATENT DOCUMENTS

| | | | |
|---|---|---|---|
| 4,062,024 | 12/1977 | Tsunekawa et al. | 354/485 |
| 4,443,085 | 4/1984 | Tomori et al. | 354/402 |
| 4,527,879 | 7/1985 | Hosoe et al. | 354/400 |
| 4,613,224 | 9/1986 | Ogasawara | 354/402 |
| 4,737,812 | 4/1988 | Hasegawa et al. | 354/400 |
| 4,922,283 | 5/1990 | Fukui | 354/484 |
| 5,043,754 | 8/1991 | Aihara et al. | 354/286 |
| 5,060,005 | 10/1991 | Itoh et al. | 354/286 X |
| 5,117,246 | 5/1992 | Takahashi et al. | 354/202 |
| 5,382,994 | 1/1995 | Naito et al. | 354/286 |

Primary Examiner—W. B. Perkey
Attorney, Agent, or Firm—Oliff & Berridge

[57] ABSTRACT

In order to prevent noise effects from occurring in a detection signal line or in a control signal line, which are small signal lines of a camera, and which are wired close and/or parallel to drive signal lines, which carry a large current, a low impedance line is provided between the drive signal line and the detection signal line and/or the control signal line. The low impedance line can be, for example, a ground line or a power source line. The drive signal line can be, for example, a line that supplies relatively high driving current to a shutter mechanism, to a vibration prevention system (which drives a vibration prevention lens in a direction substantially perpendicular to an optical axis of the lens system), and/or to an auto focus system (which drives a focus lens in a direction substantially parallel to the lens system optical axis). The detection signal lines and the control signal lines can carry detection or control signals for the vibration prevention system or the auto focus system, for example.

20 Claims, 3 Drawing Sheets

ELECTRICALLY POWERED CAMERA

BACKGROUND OF THE INVENTION

1. Field of the Invention

The present invention relates to electrically powered cameras that have a camera mechanism driven by an actuator.

2. Description of Related Art

It is known to provide electrically powered cameras with features such as an auto focus adjustment capability and an anti-vibration function. These cameras typically also include basic camera mechanisms such as a shutter system and a diaphragm system, for example, which are electrically driven by actuators, for example.

With a conventional electrically powered camera as described above, because some signal lines that carry small, low current signals are located parallel to (or otherwise close to) drive signal lines that carry larger currents (e.g., shutter actuator lines that carry the shutter driving current), the large current in the drive signal lines sometimes interferes with the small signal carrying lines, causing noise in the small signal carrying lines, which can lend to the production of false signals.

Furthermore, in an electrically powered camera with auto focus adjustment capability and anti-vibration function, the auto focus system and the vibration correction system are likely to be positioned adjacent to the shutter system due to the need to move the auto focus lens or the vibration correction lens. The detection signal lines for the detection systems that detect the movement amount of the auto focus lens and of the vibration correction lens are mounted parallel to the drive signal lines, etc. that send a large current to the actuator, etc., of the system that drives the auto focus lens and the vibration correction lens or the shutter. This also may result in possible false operation and false detection due to noise interference on the small signal lines.

SUMMARY OF THE INVENTION

In order to address the problems described above, embodiments of the present invention aim to provide an electrically powered camera that is capable of preventing detection signal lines and/or control signal lines from receiving noise when these lines are mounted close to (e.g., parallel to) drive signal lines carrying large currents.

In order to achieve these and other objects, embodiments of the invention provide a low impedance line between the drive signal line and at least one of the detection signal line and the control signal line. This reduces or eliminates the effects that the higher currents in the drive signal line have on the low current detection and/or control signals.

An electrically powered camera according to embodiments of the invention can include a detection device that outputs detection signals on a detection signal line by detecting the subject field and/or other condition of the camera. A driving device, or circuit, generates driving signals on a drive signal line. The driving signals are high current signals that drive a camera mechanism in the camera. A control device generates control signals on a control signal line based on the detection signals output by the detection device. The control signal line provides the control signal to the driving device so that the control signals are used by the driving device to generate the driving signals for driving the camera mechanism based on the control signals generated by the control device. The low impedance line is provided between the drive signal line and at least one of the detection signal line and the control signal line.

The low impedance line preferably is, for example, a ground line or a power source line that carries power from a power source of the camera.

The detection device can be, for example, a vibration detection device that detects a vibration condition of the camera and outputs a vibration detection signal on the detection signal line. The detection device also can be an auto focus detection device that detects a focus condition of a focusing lens of the camera and outputs a focus signal on the detection signal line. The detection device also can be a correction movement amount detection system that detects an amount by which the vibration correction system has moved or a focus optical system movement amount detection system that detects an amount by which a focus optical system has moved.

The control device can be, for example, a central processing unit (CPU) that receives the detection signals from the various detection systems and outputs control signals to drive devices or circuits that drive the vibration correction system, the focus optical system and/or a shutter mechanism.

For example, in an electrically powered camera having anti-vibration function, the camera would include a vibration detection system that detects the camera's vibration condition and a vibration correction control system that outputs correction control signals by computing a vibration correction amount according to vibration signals received from the vibration detection system. The camera also includes a vibration correction system that corrects for vibration by moving a vibration correction optical system in a direction substantially perpendicular to an optical axis of the camera lens system and a vibration correction driving system that drives the vibration correction system according to the correction control signals output by the vibration correction control system. The camera also can include a correction movement amount detection system that detects the correction movement amount of the vibration correction system when driven by the vibration correction driving system. The low impedance line can be provided between the drive signal line from the vibration correction driving system and one or more of the detection signal line from the vibration detection system, the detection signal line from the correction movement amount detection system, and the control signal line from the vibration correction control system.

In an example where the electrically powered camera is an auto focus camera, the camera would include a focus detection system that detects the focus condition and a focus control system that outputs focus control signals by computing an optical system movement amount according to focus signals output by the focus detection system. The camera also includes a focus system that executes focusing operations by moving a focus optical system in a direction substantially parallel to the camera lens system optical axis and a focus drive system that drives the focus system according to focus control signals output by the focus control system. The camera also can include a focus optical system movement amount detection system that detects a focus optical system movement amount by which the focus system moves when driven by the focus drive system. The low impedance line is provided between the drive signal line from the focus driving system and one or more of the detection signal line from the focus detection system, the detection signal line from the focus optical system movement amount detection system, and the control signal line from the focus control system.

A camera having an anti-vibration function and an auto focus capability could incorporate all of the features described above.

Additionally, all of the cameras described above can include a shutter opening and closing system (a shutter mechanism) and a shutter driving system that drives the shutter opening and closing system. The control system can include a shutter control system that controls the shutter driving system. The low impedance line can be provided between the drive signal line from the shutter driving system and one or more of the detection signal lines from the vibration detection system, the focus detection system, the correction movement amount detection system, and the focus optical system movement amount detection system. Additionally, the low impedance line can be located between the drive signal line from the shutter driving system and one or more of the control signal lines from the vibration correction control system, the focus control system, and the shutter control system.

With embodiments of the present invention, because low impedance lines are provided as detailed above, between each drive signal line and each detection signal line and/or control signal line, the space between large current lines and small signal lines is widened. Moreover, because low impedance lines are used between the lines, the effect of noise is minimized, resulting in more accurate detection and control.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

First Embodiment

Figure 1:
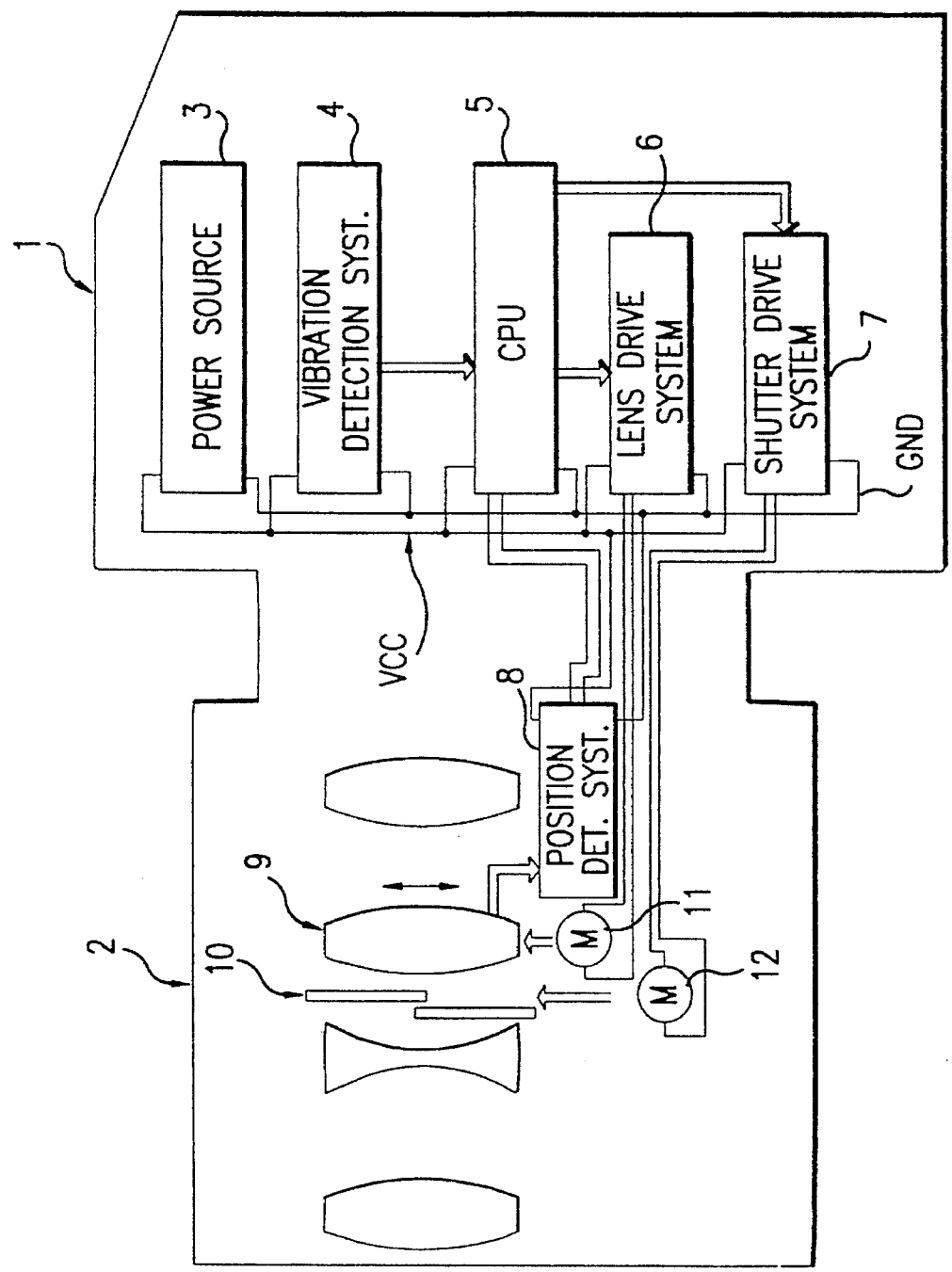
FIG. 1 is a schematic diagram illustrating the structure of an electrically powered camera according to a first embodiment of the present invention.

Hereinafter, a detailed description of embodiments of the present invention is given with reference to the drawings. Referring to FIG. 1, inside a camera body I is provided a power source 3, a vibration detection system 4, a CPU 5, a lens driving system 6, and a shutter driving system 7. Inside the camera lens barrel 2 is provided a lens position detection system 8, a vibration correction system 9, a shutter opening and closing system 10, a motor 11 to drive the vibration correction system 9, and a motor 12 to drive the shutter opening and closing system 10.

The power source 3 supplies current (i.e., power) to the vibration detection system 4, the CPU 5, the lens driving system 6, the shutter driving system 7, and the lens position detection system 8 via a VCC line.

A GND line connects the power source 3, the vibration detection system 4, the CPU 5, the lens driving system 6, the shutter driving system 7, and the lens position detection system 8 to each other.

The vibration detection system 4 detects the camera's vibration condition, and outputs to the CPU 5 vibration condition signals proportional to the magnitude of vibrations.

In addition to controlling a series of camera sequences, the CPU 5 outputs lens driving signals to the lens driving system 6 in response to vibration condition signals from the vibration detection system 4 and lens position signals from the lens position detection system 8. Furthermore, the CPU 5 outputs shutter drive signals to the shutter driving system 7 during the shutter sequence in a series of camera sequences.

Upon receiving control signals from the CPU 5, the lens driving system 6 drives the motor 11, which in turn drives the vibration correction system 9.

Upon receiving control signals from the CPU 5, the shutter driving system 7 drives the motor 12, which in turn drives the shutter opening and closing system 10.

The lens position detection circuit 8 detects the lens position of the vibration correction system 9 and inputs the lens position signals into the CPU 5.

The vibration correction system 9 is driven by the motor 11, which is driven by the lens driving system 6 and executes the movement of the vibration correction system 9 in the vertical direction, illustrated by the arrows in FIG. 1, which is substantially perpendicular to the optical axis of the lenses.

Figure 2:
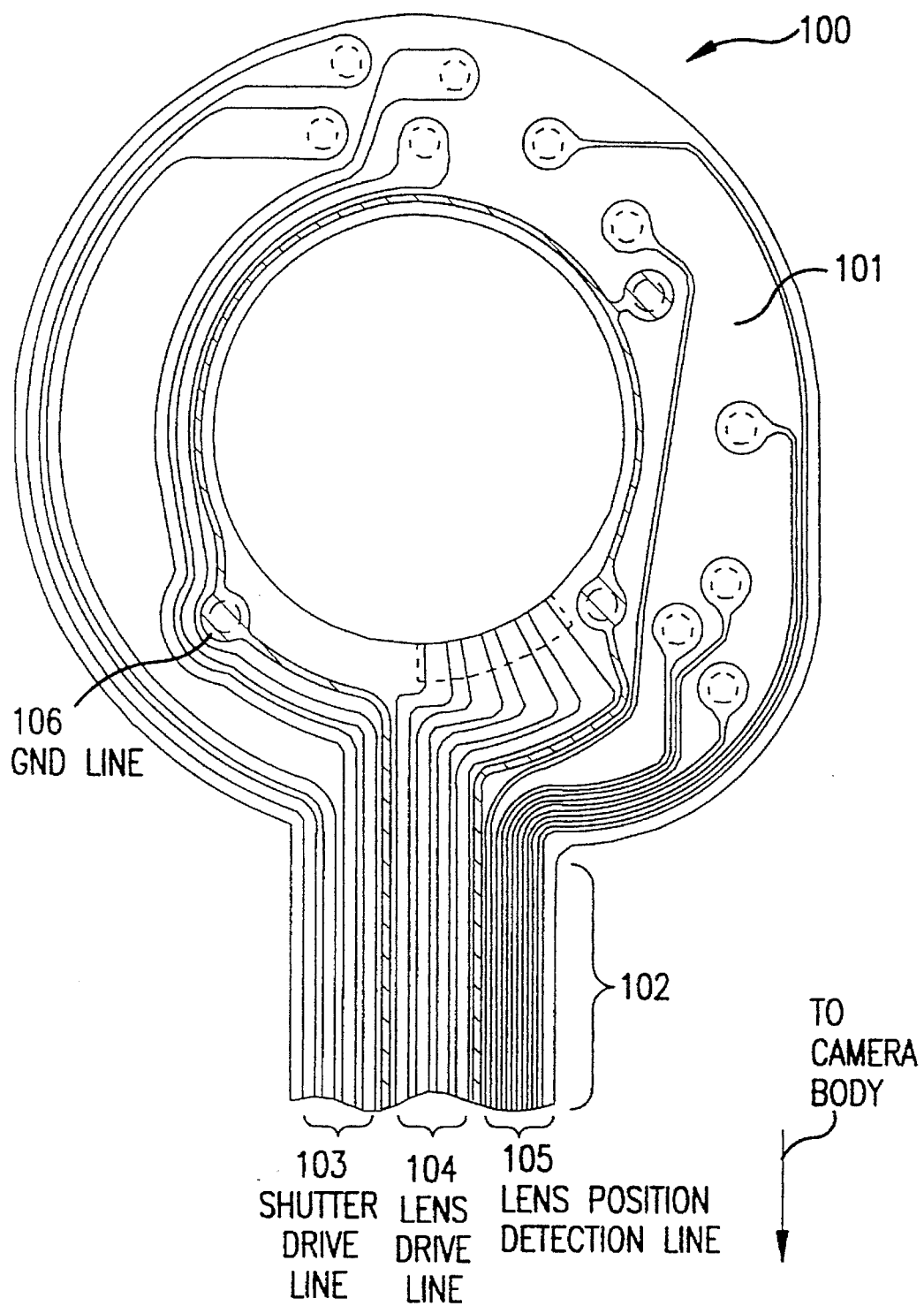
FIG. 2 illustrates an FPC (flexible printed circuit) pattern connecting the camera body and the camera lens barrel of a camera according to the first embodiment.

FIG. 2 shows an FPC (Flexible Printed Circuit) pattern for connecting the camera lens barrel to the camera body in an electrically powered camera of the present embodiment.

The FPC 100, as shown in FIG. 2, comprises an annular shaped section 101 that connects to the shutter mechanism inside the lens barrel 2 and a wiring section 102 that extends from the annular shaped section 101 and connects to the camera body 1.

The wiring section 102 is connected in the following order from left to right in FIG. 2: the shutter drive signal line 103, the ground (GND) line 106, the lens drive signal line 104, the GND line 106, and the lens position detection signal line 105. The low impedance GND line 106 is located between the lens position detection signal line 105 and the shutter drive signal line 103 and the lens drive signal line 104, both of which carry a large current. This prevents the lens position detection signal line 105, through which small signals flow, from being affected by the large currents in the lines 103, 104, which could cause noise.

As shown in FIG. 2, the GND line 106 is located on the FPC 100, and on wiring section 102 is parallel to and between lens position detection signal line 105 and drive signal lines 103 and 104, thereby increasing the distance between line 105 and drive signal lines 103, 104, as well as providing a type of shield between line 105 and drive signal lines 103, 104. Additionally, as shown in FIG. 1, GND line 106 is located between the detection signal line coupling vibration detection system 4 with CPU 5 and the drive signal lines 103, 104, increasing the distance between the lines and acting as a type of shield. As also shown in FIG. 1, GND line 106 is located between the control signal lines coupling CPU 5 with driving systems 6, 7 and the drive signal lines 103, 104, increasing the distance between these lines and acting as a type of shield. The drive signal lines 103, 104 also can be provided on a FPC that also contains the detection signal line between vibration detection system 4 and CPU 5 and the control signal lines between CPU 5 and driving systems 6 and 7, with the GND line 106 located on the FPC between drive signal lines 103, 104 and the above-described detection signal lines and control signal lines.

Second Embodiment

Figure 3:
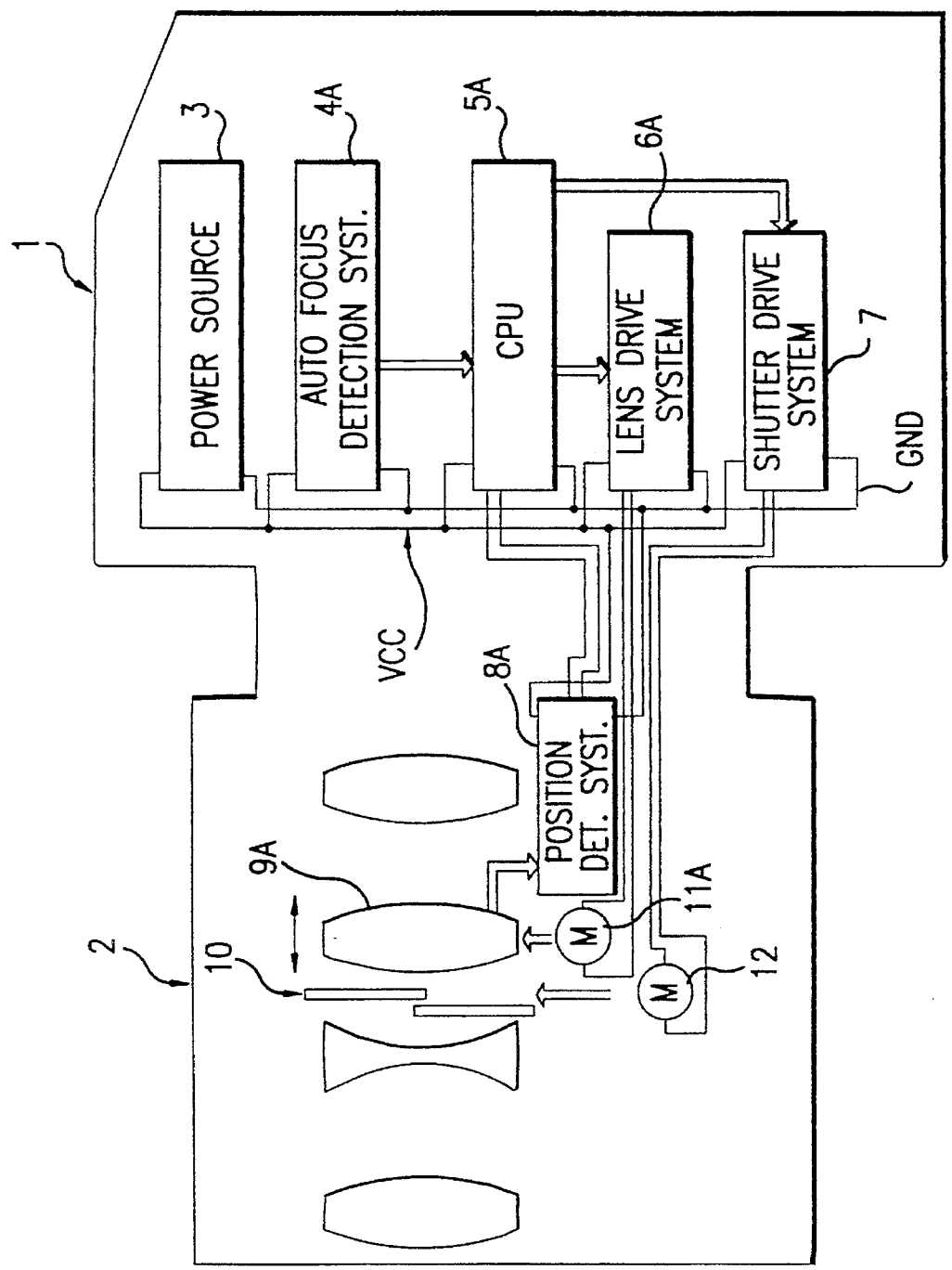
FIG. 3 is a schematic diagram illustrating the structure of an electrically powered camera according to a second embodiment of the present invention.

FIG. 3 illustrates a second embodiment of an electrically powered camera according to the present invention. The parts that perform similar functions as the parts in the first embodiment are designated by similar reference numerals in FIG. 3, and their explanations are not repeated. The first embodiment involved a camera having anti-vibration capability. The second embodiment involves an auto focus detection (AF) camera.

A camera according to the second embodiment includes an auto focus detection system 4A that detects a focus condition and outputs a focus detection signal on a detection signal line. A CPU 5A outputs focus control signals on a control signal line by computing the movement amount of the focus lens based on the focus detection signals received from the auto focus detection system 4A. A focus driving system 9A executes focusing by moving the focus lens in the direction substantially parallel to the optical axis, as indicated by the arrows in FIG. 3. In particular, based on focus control signals received from the CPU 5A, lens driving system 6A outputs a lens drive signal to a motor 11A, which drives the focus lens in the focus system 9A. A lens position detection system 8A detects output regarding the movement amount of the focus lens in the focus system 9A and provides a detection signal to CPU 5A to further monitor and control movement of focus system 9A.

In the second embodiment, a ground line GND is provided on a FPC between the drive signal line from the lens driving system 6A and the detection signal line from the lens position detection system 8A. The ground line GND also is provided on the FPC between the drive signal line from the shutter driving system 7 and the detection signal line from the lens position detection system 8A. The arrangement of the GND line on the FPC would be similar to that shown in FIG. 2, with the lines identified by numeral 104 corresponding to the detection signal lines from system 8A.

Additionally, as described above for the first embodiment, the GND line separates the drive signal lines from drive systems 6A, 7, from the detection and control signal lines between CPU 5A and systems 4A, 6A, 7 and 8A.

A camera having an auto focus capability and an anti-vibration function preferably includes the features from both embodiments described above. For example, referring to FIG. 2, the lines identified by numeral 105 will be detection signal lines between a CPU and lens position detection systems 8 and 8A; and the lines identified by numeral 104 would be drive signal lines coupling vibration correction system 9 and auto focus system 9A with their respective drive systems 6 and 6A.

The present invention includes a variety of variations and modifications and is not limited to the embodiments described above. For example, while a ground line has been described for use as a low impedance line, a power source line (VCC) also could be used instead of, or in addition to the ground line.

Also, a low impedance line can be provided between control signal lines from the CPU 5, 5A and a drive signal line that carries a large current. Moreover, the present invention can be applied to camera mechanism parts other than the shutter opening and closing system, such as the diaphragm system, the lens cover system, and the power zoom system, for example.

As described above, in embodiments of the present invention, a low impedance line such as, for example, a ground line or a power source line is provided between the drive signal line and the detection signal line and between the drive signal line and the control signal line, enabling the space between large current lines and small signal lines to be widened. Moreover, due to the low impedance line provided between the large current and small signal lines, the effect from noise is minimized and accurate detection or control is realized.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An electrically powered camera comprising:

a detection device that outputs detection signals on a detection signal line;

an electrically powered camera mechanism;

a control device that generates control signals on a control signal line based on the detection signals provided from said detection device, said control device coupled to said detection device by said detection signal line;

a driving device that generates driving signals on a drive signal line based on said control signals provided from said control device, said driving device coupled to said control device by said control signal line and coupled to said camera mechanism by said drive signal line; and a low impedance line located between the drive signal line and at least one of said detection signal line and said control signal line.

2. A camera according to claim 1, wherein:

said detection device is a vibration detection device that detects a vibration condition of said camera and outputs a vibration detection signal on said detection signal line, which is a first detection signal line;

said control device is a vibration correction control device that outputs a correction control signal on said control signal line by determining a vibration correction amount based on the vibration detection signal provided from said vibration detection device;

said camera mechanism is a vibration correction optical system movable in a direction substantially perpendicular to an optical axis of said camera;

said driving device is a vibration correction driving device that drives said vibration correction optical system by outputting a vibration correction drive signal on said drive signal line based on said correction control signal output from said vibration correction control device; and further comprising:

a correction movement amount detection device that detects a correction movement amount of said vibration correction optical system when driven by said vibration correction driving device and outputs a correction amount signal on a second detection signal line to said vibration correction control device; and wherein:

said low impedance line is provided between said drive signal line and at least one of said first detection signal line, said second detection signal line, and said control signal line.

3. A camera according to claim 1, wherein:

said detection device is a focus detection device that detects a focus condition of a focusing optical system of said camera and outputs a focus detection signal on said detection signal line, which is a first detection signal line;

said control device is a focus control device that outputs a focus control signal on said control signal line by determining a focusing optical system movement amount based on said focus detection signal output from said focus detection device;

said camera mechanism is said focusing optical system, which is movable in a direction substantially parallel to an optical axis of said camera;

said driving device is a focus driving device that drives said focusing optical system by outputting a focus drive signal on said drive signal line based on said focus control signal output from said focus control device; and further comprising:

a focusing optical system movement amount detection device that detects a movement amount of said focusing optical system when driven by said focus driving device and outputs a movement amount signal on a second detection signal line to said focus control device; and wherein:

said low impedance line is provided between said drive signal line and at least one of said first detection signal line, said second detection signal line, and said control signal line.

4. A camera according to claim 2, further comprising:

a shutter opening and closing system and a shutter driving device that drives said shutter opening and closing system, said shutter driving device linked to said shutter opening and closing system by a shutter drive signal line;

said control device includes a shutter control device that provides a control signal on a shutter control signal line to said shutter driving device; and wherein:

said low impedance line is provided between said shutter drive signal line and at least one of said first detection signal line, said second detection signal line, said control signal line, and said shutter control signal line.

5. A camera according to claim 3, further comprising:

a shutter opening and closing system and a shutter driving device that drives said shutter opening and closing system, said shutter driving device linked to said shutter opening and closing system by a shutter drive signal line;

said control device includes a shutter control device that provides a control signal on a shutter control signal line to said shutter driving device; and wherein:

said low impedance line is provided between said shutter drive signal line and at least one of said first detection signal line, said second detection signal line, said control signal line, and said shutter control signal line.

6. A camera according to claim 1, wherein said detection device detects a subject field of said camera.

7. A camera according to claim 1, wherein said detection device detects a condition of a component of said camera.

8. A camera according to claim 1, wherein said low impedance line is a ground line.

9. A camera according to claim 1, wherein said low impedance line is a power source line.

10. A camera according to claim 1, further comprising a flexible printed circuit, said flexible printed circuit including at least said drive signal line, said detection signal line and said low impedance line located between said drive signal line and at least said detection signal line.

11. A camera according to claim 10, wherein said flexible printed circuit extends between a lens portion of said camera and a body portion of said camera.

12. A camera according to claim 1, wherein said detection device is a vibration detection device that detects a vibration condition of said camera and outputs a vibration detection signal on said detection signal line.

13. A camera according to claim 1, wherein said detection device is an auto focus detection device that detects a focus condition of said camera and outputs a focus detection signal on said detection signal line.

14. A camera according to claim 1, wherein said detection device is a lens movement amount detection device that detects an amount of movement of a lens of said camera and outputs a movement detection signal on said detection signal line.

15. A camera according to claim 1, wherein said control device is a vibration correction control device that determines a vibration correction amount and outputs a vibration correction control signal on said control signal line based on said vibration correction amount.

16. A camera according to claim 1, wherein said control device is a focus control device that determines an optical system movement amount and outputs a focus control signal on said control signal line based on said optical system movement amount.

17. A camera according to claim 1, wherein said control device is a shutter control device that outputs a shutter control signal on said control signal line.

18. A camera according to claim 1, wherein said camera mechanism is a vibration correction optical system movable in a direction substantially perpendicular to an optical axis of said camera, and said driving device is a vibration correction driving device that outputs a vibration correction drive signal on said drive signal line to said vibration correction optical system.

19. A camera according to claim 1, wherein said camera mechanism is a focus correction optical system movable in a direction substantially parallel to an optical axis of said camera, and said driving device is a focus driving device that outputs a focus drive signal on said drive signal line to said focus correction optical system.

20. A camera according to claim 1, wherein said camera mechanism is a shutter mechanism, and said driving device is a shutter driving device that outputs a shutter drive signal on said drive signal line to said shutter mechanism.

* * * * *